(No Model.)  F. G. KOEHLER.  2 Sheets—Sheet 1.
CAR TRUCK.
No. 601,022.  Patented Mar. 22, 1898.
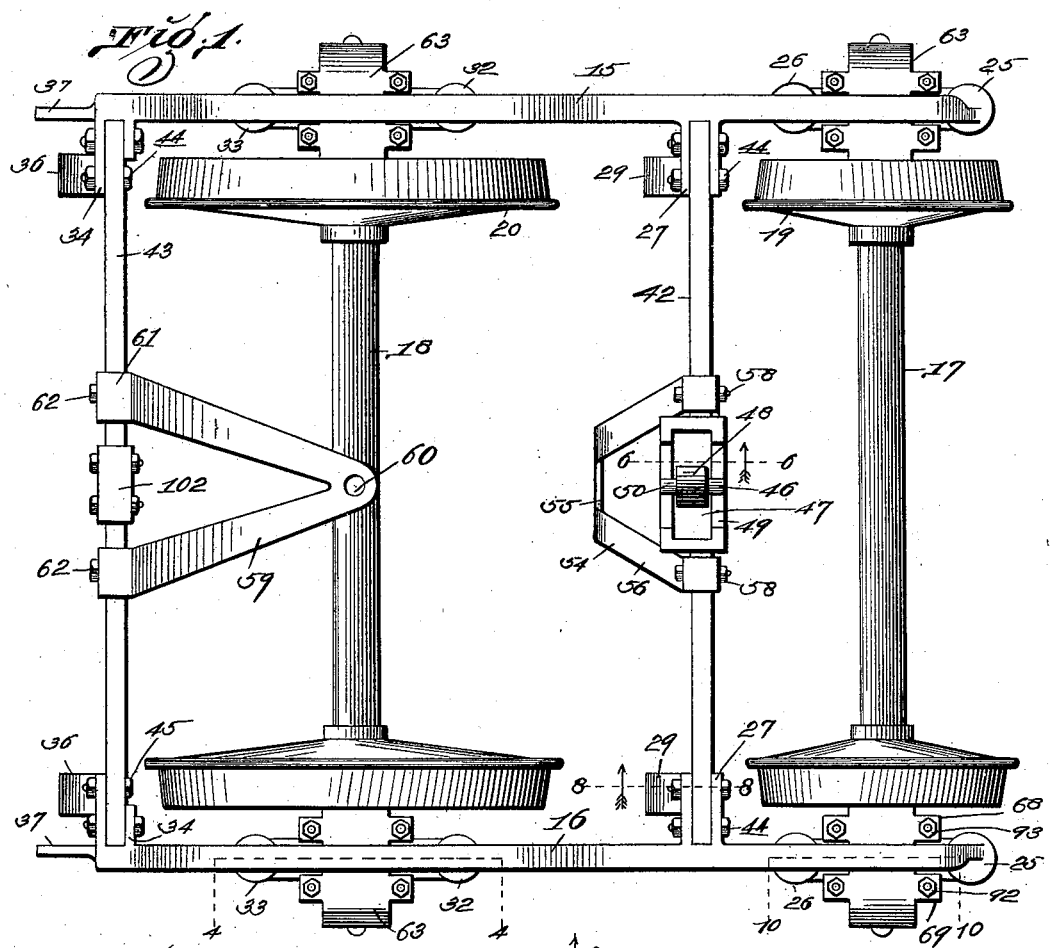
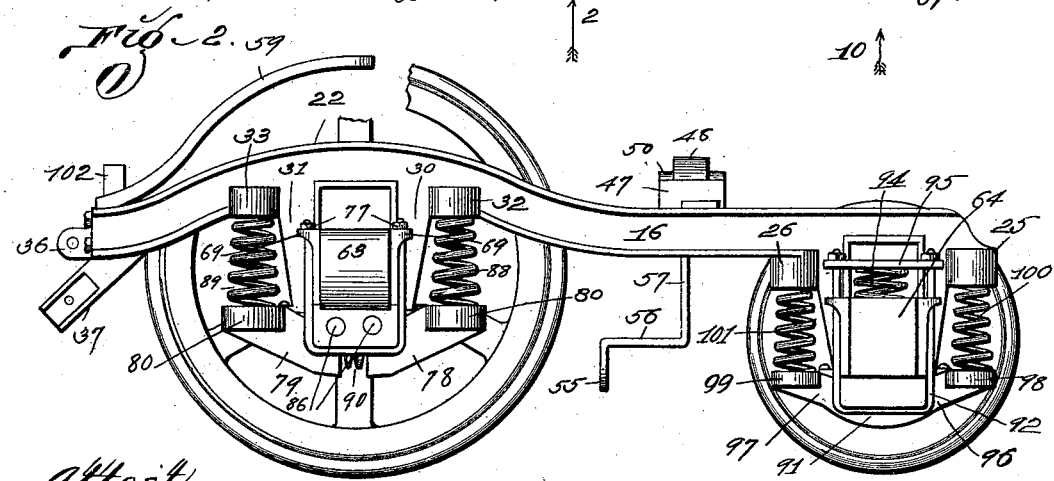
Attest:
N. T. Smith
A. J. McCauley
Inventor:
Frank G. Koehler
By Higdon, Longan & Higdon
Attys

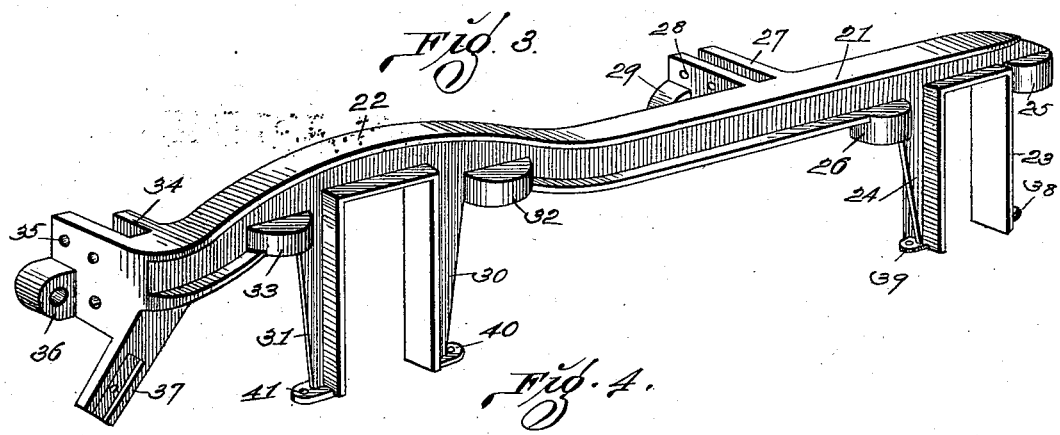
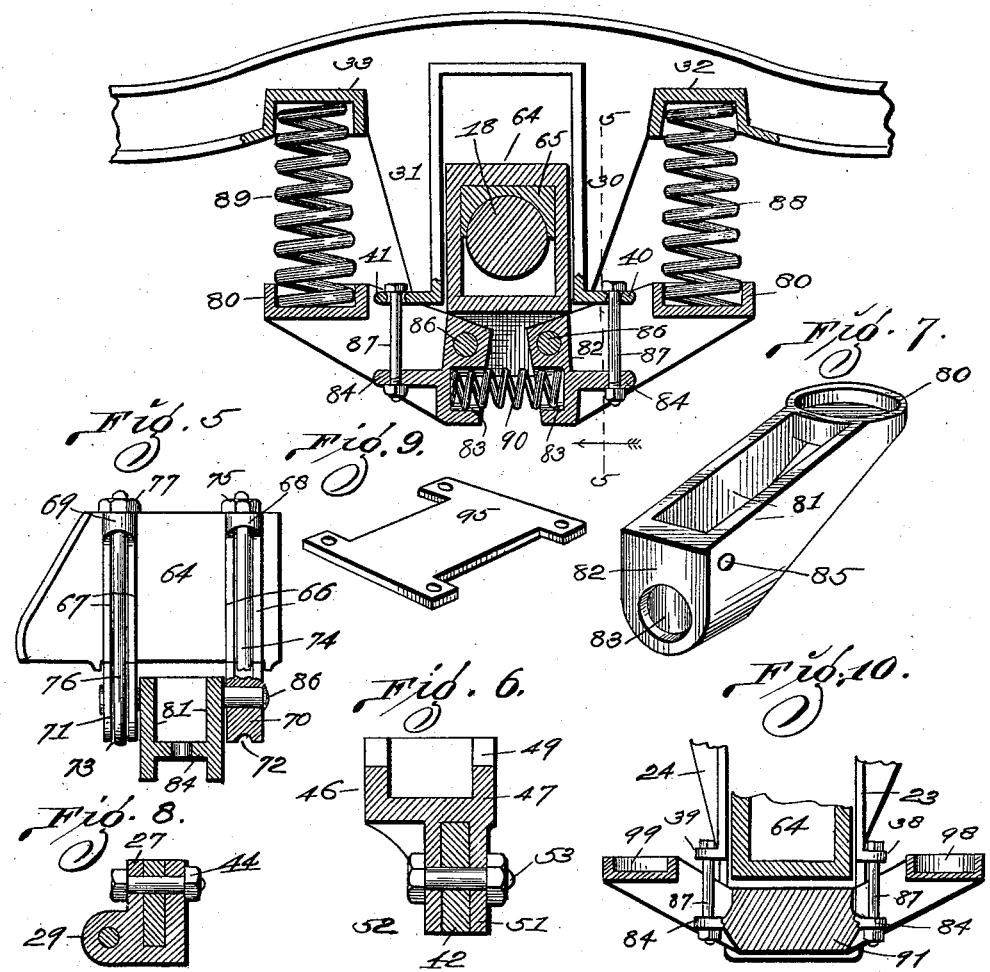

UNITED STATES PATENT OFFICE.

FRANK G. KOEHLER, OF ST. LOUIS, MISSOURI, ASSIGNOR TO THE LACLEDE CAR COMPANY, OF SAME PLACE.

CAR-TRUCK.

SPECIFICATION forming part of Letters Patent No. 601,022, dated March 22, 1898.

Application filed June 24, 1897. Serial No. 642,172. (No model.)

*To all whom it may concern:*

Be it known that I, FRANK G. KOEHLER, of the city of St. Louis, State of Missouri, have invented certain new and useful Improvements in Car-Trucks, of which the following is a full, clear, and exact description, reference being had to the accompanying drawings, forming a part thereof.

My invention relates to car-trucks; and it consists of the novel construction, combination, and arrangement of parts hereinafter shown, described, and claimed.

Figure 1 is a top plan view. Fig. 2 is a side elevation. Fig. 3 is a view in perspective of one of the side bars. Fig. 4 is a longitudinal section taken approximately on the line 4 4 of Fig. 1, parts being broken away to economize space. Fig. 5 is a cross-section taken approximately on the line 5 5 of Fig. 4. Fig. 6 is a vertical section transversely of one of the cross-bars and taken approximately on the line 6 6 of Fig. 1. Fig. 7 is a perspective of one of the pivoted spring-seats which I employ. Fig. 8 is a vertical section transversely of one of the cross-bars and taken approximately on the line 8 8 of Fig. 1. Fig. 9 is a view in perspective of a sliding spring-seat. Fig. 10 is a vertical section taken approximately on the line 10 10 of Fig. 1, parts being broken away to economize space.

Referring by numerals to the drawings, the side bars 15 and 16 are essentially alike, except that they are constructed in rights and lefts. The axles 17 and 18 are mounted in parallel positions transversely of the side bars, and the small wheels 19 are mounted upon the axle 17, and the large wheels 20 are mounted upon the axle 18. In actual use two trucks are employed under a car, and the small wheels are placed toward the center of the car, while the large wheels are under the ends of the car. For convenience I will assume that the truck shown in Fig. 1 is the front truck of a car.

The details of the side bars 15 and 16 are shown in Fig. 3. The side bar proper consists of the horizontal portion 21, which is located above the oil-boxes of the small wheels, and the upwardly-curved portion 22, located above the oil-boxes of the large wheels. The boxes of the large wheels are higher from the rail than the boxes of the small wheels, and it is necessary to curve the side bar outwardly from the level of the portion 21 in order to get over the boxes of the large wheels.

The housing-posts 23 and 24 extend downwardly from the rear end of the side bar, the inner faces of said posts being vertical and parallel, thus forming the housing for the oil-box of the axle 17. The upper spring-seat 25 extends downwardly from the extreme rear end of the side bar upon the rear side of the post 23, and the upper spring-seat 26 extends downwardly from the side bar in front of the housing-post 24. Extending inwardly from the central part of the portion 21 of the side bar is a channel-bar-shaped arm 27, the top side of said arm being open, and bolt-holes 28 are formed horizontally through said arm. A perforated ear 29 extends forwardly from the inner end of the arm 27, the brake-hangers (not shown) being pivotally connected to said ears.

The housing-posts 30 and 31 extend downwardly from the center of the portion 22 of the side bar, the inner faces of said housing-posts being vertical and parallel, thus forming a housing for the oil-box of the axle 18. The upper spring-seat 32 extends downwardly from the side bar immediately behind the housing-post 30, and the upper spring-seat 33 extends downwardly from the side bar immediately in front of the housing-post 31. Extending inwardly from the extreme forward end of the side bar is a channel-bar-shaped arm 34, similar to the arm 27 and having the horizontal bolt-holes 35. The perforated lug 36 extends forwardly from the inner end of the arm 34. Extending forwardly and downwardly at an angle of about forty-five degrees from the forward end of the side bar is the fender-arm 37. The ears 38 and 39 project in opposite directions from the lower ends of the posts 23 and 24, respectively, and the ears 40 and 41 project in opposite directions from the lower ends of the posts 30 and 31, respectively, said ears 38 and 39 and 40 and 41 being vertically perforated. The parts 21 to 41, inclusive, are all formed integral.

The rear ends of the side bars 15 and 16 are connected by the cross-bar 42, and the forward ends of said side bars are connected by the cross-bar 43. The cross-bars 42 and 43 are substantially alike and are rectangular in cross-section. The ends of the cross-bar 42 are placed in the slots in the arms 27 and are secured in position by means of the bolts 44, inserted through the bolt-holes 28. The ends of the cross-bar 43 are placed in the slots in the arms 34 and are secured in position by means of the bolts 45, inserted through the bolt-holes 35. The center bearing 46 is mounted upon the center of the cross-bar 42, and said center bearing consists of the rectangular box 47, mounted in a horizontal position and extending longitudinally of the cross-bar, said box being open at its top, as required to form a free passage for the roller 48, and the upper edges of the side walls 49 of said box are cut away to form tracks for the spindles 50 of the roller, the travel of said spindles being limited by the length of the cut-away portions of said wheels.

Flanges 51 and 52 extend downwardly from the bottom of the box 47 and upon opposite sides of the cross-bar 42, and bolts 53 are inserted horizontally through said flanges and through said cross-bar, as required to hold the box securely in position. The lower supporting-frame 54 is attached to the central part of the cross-bar 42.

The motor-supporting frame consists of the central portion 55, which occupies a vertical position, extending in a plane parallel with the cross-bar 42, and of the intermediate portions 56, which occupy horizontal positions and extend from the ends of the central portion 55 diagonally backward to a position below the cross-bar, and of the end portions 57, which extend upwardly from the rear end of the intermediate portions 56, the upper ends of the end portions being bent into the form of hooks and said hooks engaging the cross-bar 42. The bolts 58 secure the hooks to the cross-bar.

The bolster 59 is attached to the cross-bar 43. The bolster 59 is V-shaped in plan and has a vertical opening 60 through its point or central portion to receive the king-bolt, said opening 60 being directly above the center of the axle 18. The ends 61 of the V are transversely bifurcated and extend downwardly upon opposite sides of the cross-bar and are secured to the cross-bar by means of the bolts 62. The oil-boxes 63 of the axle 18 are mounted between the housing-posts 30 and 31 and are constructed and mounted as shown in detail in Figs. 2, 4, 5, and 7. The rectangular box 64 is open at its inner end and fits closely between the posts 30 and 31. The bearing-plate 65 fits within the upper part of the box 64, and the axle 18 operates against the plate 65. Pairs of ribs 66 are formed upon opposite sides of the box 64 inside of the posts 30 and 31, and pairs of ribs 67 are formed upon said box outside of said posts, one side of the box being shown in Fig. 5 and the opposite side of the box being identical. The upper ends of the ribs 66 are connected by or merged into the vertical perforated ears 68, and the upper ends of the ribs 67 are connected by or merged into the vertical perforated ears 69. The plates 70 and 71 are placed in vertical alinement with the ribs 66 and 67, respectively, the upper edges of the plates engaging the lower face of the box 64. A groove 72 is formed upon three sides of the plate 70 in alinement with the groove between the ribs 66, and a similar groove 73 is formed in the plate 71 in alinement with the groove between the ribs 67.

The U-shaped clip 74 is placed in the groove 72 and between the ribs 66 and extending upwardly through the ears 68, and said clip is held in position by the nut 75, resting upon the ears 68. A similar clip 76 is placed in the groove 73 and between the ribs 67 and extending upwardly through the ears 69 and is held in position by the nut 77.

The pivoted spring-seats 78 and 79 are mounted between the plates 70 and 71. The spring-seats 78 and 79 are substantially alike and are constructed as shown in Figs. 4, 5, and 7. Referring to the spring-seat 78, the lower vertical spring-seat 80 mates with the upper spring-seat 32. The parallel arms 81 extend horizontally from the spring-seat 80, and the ends of the arms 81 opposite the spring-seat are connected by the vertical wall 82. The horizontal spring-seat 83 is formed from the outer face of the wall 82. A horizontal plate 84 is located between the arms 81, immediately inside of the wall 82. A horizontal opening 85 is formed through the wall 82 above the spring-seat 83, and the spring-seat is placed in position with the wall 82 between the plates 70 and 71. A pin 86 is inserted through the plate 70, then through the opening 85, and then through the plate 71, as required to form a pivotal connection between the spring-seats and the oil-box. A bolt 87 is inserted loosely through the ear 40 and then through the plate 84, and a nut is inserted upon the lower end of the bolt. The spring-seat 79 is constructed and mounted in the same manner as the spring-seat 78.

An expansive coil-spring 88 is inserted between the spring-seats 32 and 80, and a similar spring 89 is inserted between the spring-seats 33 and 80. An expansive coil-spring 90 is inserted between the spring-seats 83.

Referring to the oil-box of the axle 17, and especially to Figs. 2, 9, and 10, the box 64 is placed between the housing-posts 23 and 24. The block 91 is placed below the box 64. The U-shaped clips 92 and 93, similar to the clips 74 and 76, are placed around the ends of the block 92 and extend upwardly through the ears 68 and 69. A coil-spring 94 is placed above the box 64, and the sliding spring-seat 95 is placed between the housing-posts 23 and 24 above the box 64 upon the spring 94, and the clips 92 and 93 extend upwardly through said plate 95, thus forming a spring-actuated connection between the block 92 and the box 64. The arms 96 and 97 extend horizontally from the sides of the block 92. The spring-seats 98 and 99 are formed upon the outer ends of the arms 96 and 97, respectively, and the springs 100 and 101 are inserted between the spring-seats 25 and 26, respectively, and the spring-seats 98 and 99. The block 102 is attached to and extends upwardly from the center of the cross-bar 43.

The bed of the car rests upon the bearing-roller 48 and upon the block 102, and the king-bolt passes through the opening 60. The weight of the car compresses the springs 88 and 89, depresses the spring-seats 80, thus compressing the springs 90 at the forward end of the truck, and at the rear end of the truck the weight of the car compresses the springs 100 and 101 and depresses the spring-seats 98 and 99, thus compressing the spring 94. When the springs 88 and 89 are compressed, the bolts 87 slide through the ears 40 and 41 or through the plates 84, and when said springs expand said bolts hold the side bars from raising too high above the oil-boxes. The arms 96 and 97 are constructed in pairs and are substantially alike. The arms 81 and the plates 84 are formed between said arms to receive the bolts 87, which are inserted downwardly through the ears 38 and 39, thus holding the rear ends of the side bars in position relative to the rear oil-boxes.

The motor is mounted upon the frame 54, which frame is connected through the cross-bars 42 to the side bars, thus throwing the weight of the motor upon the springs which support the car-bed, and a motor so mounted will ride easier and last longer than when mounted directly upon the axles.

The springs forming the connection between the side bars and the axles are all mounted in alinement with the side bars and under the side bars.

The perforated ears 29 serve as hangers for the brake-shoes, which engage the small wheels, and the perforated ears 36 serve as hangers for the brake-shoes, which engage the large wheels.

I claim—

1. In a car-truck, side bars connecting the oil-boxes, a cross-bar connecting said side bars and located between the front and rear wheels of the truck, a cross-bar connecting said side bars and located in front of the front wheels of the truck, sets of housing-posts projecting downwardly from said side bars, upper spring-seats projecting downwardly from said side bars upon opposite sides of said sets of housing-posts, said housing-posts and said spring-seats being in alinement with said side bars, and fender-arms projecting forwardly and downwardly from the forward ends of said side bars, substantially as specified.

2. In a car-truck, side bars connecting the oil-boxes, channel-bar-shaped arms projecting inwardly from said side bars at points between the front and rear wheels of the truck, a cross-bar having its ends mounted in the channels of said arms and secured in position, brake-hangers projecting from said arms, and a motor-supporting frame attached to said cross-bar, substantially as specified.

3. In a car-truck, a side bar, a pair of housing-posts projecting downwardly from said side bar, upper spring-seats projecting downwardly from said side bar upon opposite sides of said housing-posts, an oil-box slidingly mounted between said housing-posts, plates mounted in vertical parallel positions and securely attached to said oil-box, blocks pivotally mounted between said plates and slidingly connected to said housing-posts, an expansive coil-spring mounted in a horizontal position between said pivoted blocks, and expansive coil-springs mounted between said spring-seats and said pivoted blocks, substantially as specified.

4. In a car-truck, a side bar, a set of housing-posts projecting downwardly from said side bar, an oil-box slidingly mounted between said housing-posts, a block mounted below said oil-box and slidingly connected to said housing-posts and to said oil-box, an expansive coil-spring inserted in position to normally hold said block against said oil-box, arms projecting outwardly from said block, lower spring-seats formed in the outer ends of said arms, upper spring-seats projecting downwardly from said side bar upon opposite sides of said housing-posts and expansive coil-springs inserted between said lower and said upper spring-seats, substantially as specified.

5. In a car-truck, side bars connecting the oil-boxes, a cross-bar connecting said side bars and located between the front and rear wheels of the truck, a cross-bar connecting said side bars and located in front of the front wheels of the truck, sets of housing-posts projecting downwardly from said side bars, upper spring-seats projecting downwardly from said side bars upon opposite sides of said sets of housing-posts, said housing-posts and said spring-seats being in alinement with said side bars, fender-arms projecting forwardly and downwardly from the forward ends of said side bars, arms projecting from the first-mentioned cross-bar, brake-hangers projecting from the last-mentioned arms, and a motor-supporting frame attached to said first-mentioned cross-bar, substantially as specified.

6. In a car-truck, side bars connecting the oil-boxes, channel-bar-shaped arms projecting inwardly from said side bars at points between the front and rear wheels of the truck, a cross-bar having its ends mounted in the channels of said arms and secured in position, brake-hangers projecting from said arms, a motor-supporting frame attached to said cross-bar, a box attached to said cross-bar, and a roller operating in said box, the axis of said roller being in a line transversely of the axis of the wheels to form a center bearing for the bed of the car, substantially as specified.

7. In a car-truck, side bars connecting the oil-boxes, a cross-bar connecting said side bars and located between the front and rear wheels of the truck, a cross-bar connecting said side bars and located in front of the front wheels of the truck, sets of housing-posts projecting downwardly from said side bars, upper spring-seats projecting downwardly from said side bars upon opposite sides of said sets of housing-posts, said housing-posts and said spring-seats being in alinement with said side bars, a bolster attached to the front cross-bar and extending upwardly and backwardly to a point substantially in vertical alinement with the front axle, and fender-arms projecting forwardly and downwardly from the forward ends of said side bars, substantially as specified.

In testimony whereof I affix my signature in presence of two witnesses.

FRANK G. KOEHLER.

Witnesses:
EDWARD E. LONGAN,
S. G. WELLS.